No. 886,631. PATENTED MAY 5, 1908.
J. C. PARKER.
JUNCTION BOX FOR STEAM GENERATORS.
APPLICATION FILED DEC. 16, 1904.
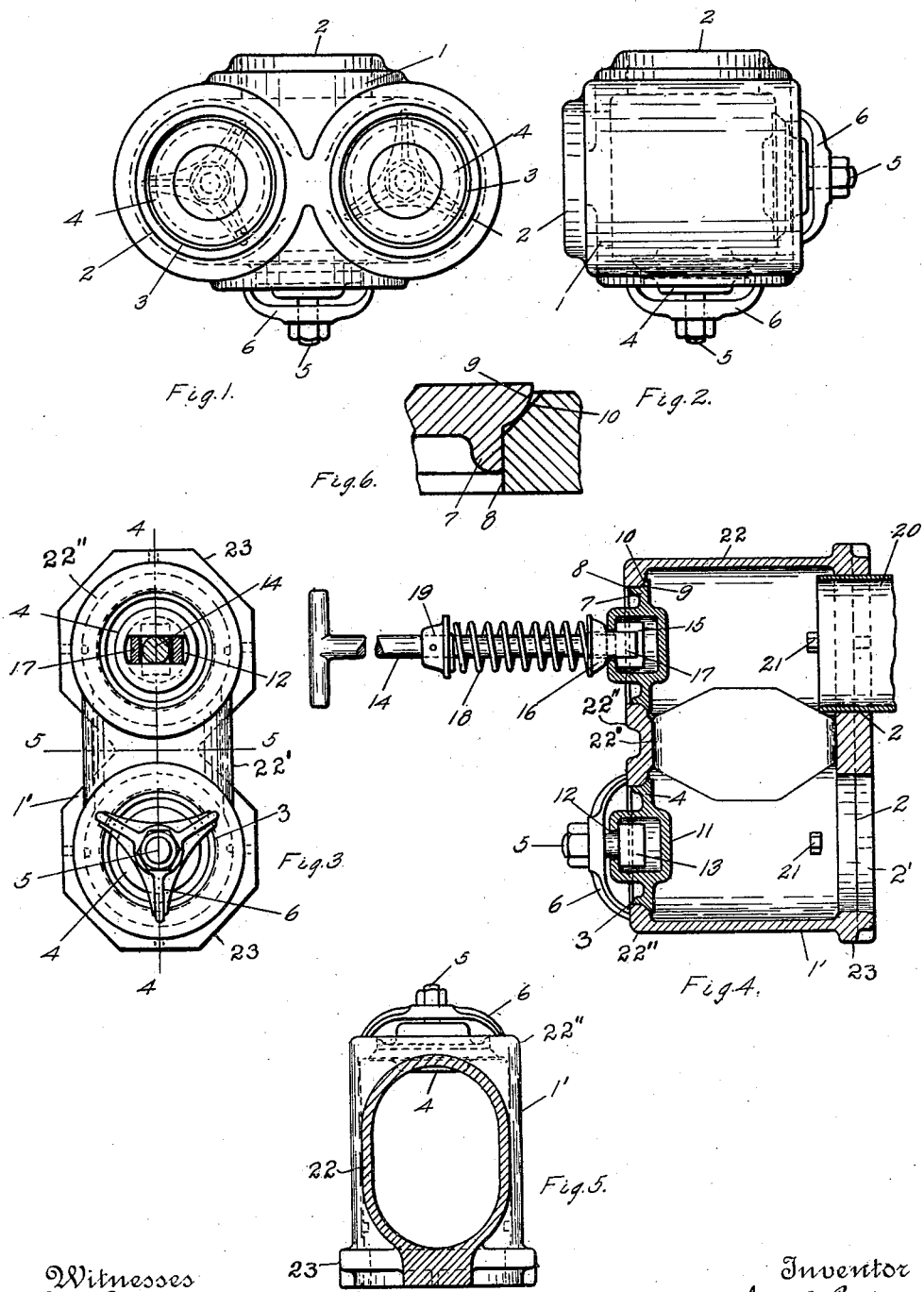
Witnesses
Inventor
Jno. C. Parker

UNITED STATES PATENT OFFICE.

JOHN C. PARKER, OF PHILADELPHIA, PENNSYLVANIA.

JUNCTION-BOX FOR STEAM-GENERATORS.

No. 886,631.  Specification of Letters Patent.  Patented May 5, 1908.

Application filed December 16, 1904. Serial No. 237,083.

*To all whom it may concern:*

Be it known that I, JOHN C. PARKER, a citizen of the United States, residing at Philadelphia, in the county of Philadelphia and State of Pennsylvania, have invented certain Improvements in Junction-Boxes for Steam-Generators, of which the following is a specification.

This invention is, in part, divided from my application filed January 8, 1901, No. 41,859, and it has for its leading purpose to provide a box that can readily be applied to the connection of a plurality of tubes and permit ready access thereto while securing tight joints.

The nature and characteristic features of the improvements will more fully appear by reference to the following description and the accompanying drawings in illustration thereof, of which:—

Figure 1 represents a view of a junction box made according to my invention for connecting three tubes: Fig. 2 represents a view of the same taken at right angles to the position shown in Fig. 1: Fig. 3 represents a view of the invention adapted for connecting two tubes, the spider for holding one of the hand hole covers being removed: Fig. 4 represents a sectional view taken on the line 4—4 of Fig. 3: Fig. 5 represents a sectional view taken on the line 5—5 of Fig. 3: and Fig. 6 represents an enlarged sectional view showing the relation of the bearing surfaces of the hand hole and cover.

As shown in the drawings, the three way box 1 and the two way box 1' are each provided with the circular tube holes 2 and the circular hand holes 3, the latter being of smaller diameter than the former and placed in line therewith. Circular covers 4, of larger diameter than the hand holes and smaller diameter than the tube holes, and the exteriors of the tubes are inserted in the box through the tube holes and seated on the hand holes, the covers being held on their seats by bolts 5 connected therewith and with spiders 6 bearing on the boxes. The covers have the cylindrical guiding rings 7, which lie within the cylindrical surfaces 8 of the hand holes, and the convex rings 9 which fit the conical bearing surfaces 10 of the hand holes. The covers have the hollow bodies 11 with the slots 12 therein to receive the T-heads 13 of the bolts, the T-heads being inserted through the slots and turned to engage them within the bodies. The bolts, thus engaged with the covers, are engaged with the spiders and drawn up to press the covers on their seats.

The covers having been inserted in the boxes through the tube holes, the tubes 20 are inserted and the boxes forced upon them until the lugs 21 on the boxes make contact with the ends of the tubes, the latter being then expanded in place. The tube holes have the tapered or flared inlet portions 2' to aid the entry of rough tube ends and to reinforce the construction.

To grind the bearings of the covers and hand holes, in order to procure steam tight joints between the metal bearing surfaces thereof, there is used a wrench 14 having a T-head 15 at the end of its shank and a button or bearing device 16 sleeved on the shank so as to reciprocate longitudinally. The button has the squared fingers or bifurcations 17 which engage the T-head to prevent the button from turning on the shank and to engage the slot of the cover to prevent the wrench from turning with reference thereto. A coiled spring 18, supported by the bearing 19 fixed to the wrench, presses against the button 16 to hold the wrench and cover firmly locked together so that the cover can be manipulated readily and the bearing surfaces of the hand hole and cover ground together.

The box has the cylindrical ends 22 joined by the curved body or intermediate portion 22' contracted with reference to the ends. The end bosses 22'', projecting beyond the body, are of circular section and provide an approximately equal distribution of metal about the respective hand holes. Hence upon contraction or expansion, the action is equalized and the proper relation of the covers to their seats is not disturbed.

The design of the box is preferably such that the velocity of flow therethrough is approximately that through the tubes, so that there shall be no material inertia to be overcome as in the case of boxes of such sectional area that the velocity of flow therein is materially less than through the tubes.

In the vertical position of the box, when the upper cover is disengaged from the hand hole therefor, it may be turned down and supported by the hole or turned around and dropped to the bottom out of the way of a tool inserted through the hole to act upon the tube. When the box is in the vertical position, the lower cover, or when the box is in the horizontal position, either cover, may be turned down and supported on the box wall adjacent to the corresponding hole in position for ready access therefrom: and when it is desired to remove the covers out of the line of the corresponding hand and tube holes, they may be turned around and passed through the body out of the way. This construction thus obviates the dropping of the covers and the difficulty of recovering them in the usual constructions.

The boxes have the octagonal flanges 23 which provide bearings for fitting them together, and holes between them for access to the exterior surfaces of the tubes, the contracted body portions providing holes between adjacent boxes arranged in parallel. The boxes thus constructed permit the use of small hand holes of the same diameter as the bore of the tubes, provide a line bearing that can be ground readily to secure a correct joint between the cover and hand hole, prevent the covers from dropping out of reach when removed and permit them to be handled with facility, secure substantial bearings and free access between the boxes, and provide a strong, tight and uniformly expanding and contracting union for the tubes.

Having described my invention, I claim:—

1. A junction box having a circular tube hole, a circular hand hole of diameter smaller than that of the exterior of the tube to be engaged in said tube hole, and a circular cover of diameter larger than that of said hand hole and smaller than that of the exterior of the tube to be engaged in said tube hole.

2. A junction box having a plurality of circular tube holes, a plurality of circular hand holes of diameter smaller than that of the exterior of the tubes to be received by said tube holes, and a plurality of circular covers of diameter smaller than that of the exteriors of said tubes, said covers having line bearings with said hand holes.

3. A junction box having cylindrical ends, octagonal flanges thereon, and a contracted body connecting said ends.

In testimony whereof I have hereunto set my hand this 15th day of December, A. D. 1904, in the presence of the subscribing witnesses.

JOHN C. PARKER.

Witnesses:
   FORREST N. MAGEE,
   UTLEY E. CRANE, Jr.